United States Patent [19]

Jeffs

[11] 4,427,452

[45] Jan. 24, 1984

[54] FILLED ELASTOMER COMPOSITIONS

[75] Inventor: David G. Jeffs, St. Austell, England

[73] Assignee: English Clays Lovering Pochin & Company Limited, St. Austell, England

[21] Appl. No.: 414,518

[22] Filed: Sep. 2, 1982

Related U.S. Application Data

[63] Continuation-in-part of Ser. No. 191,067, Sep. 26, 1980, abandoned.

[51] Int. Cl.³ .................................................. C09C 1/28
[52] U.S. Cl. ............................ 106/308 Q; 106/308 N; 501/148; 501/150
[58] Field of Search ............................... 501/148, 150; 106/288 B, 308 Q, 308 N

[56] References Cited

U.S. PATENT DOCUMENTS

| | | | |
|---|---|---|---|
| 3,227,625 | 1/1966 | Papalos | 106/308 Q |
| 3,290,165 | 12/1966 | Iannicelli | 106/308 N |
| 3,309,214 | 3/1967 | Podschos et al. | 501/150 |

FOREIGN PATENT DOCUMENTS 866326  4/1961  United Kingdom ................ 501/150

Primary Examiner—James Poer
Attorney, Agent, or Firm—Weingram & Klauber

[57] ABSTRACT

A filled elastomer composition comprises a natural or synthetic rubber and, as a filler, a substantially dehydroxylated clay which contains at least 60% by weight of particles smaller than 2 microns equivalent spherical diameter, has a specific gravity not greater than 2.4 and a spherical surface area of at least 10 $m^2g^{-1}$ and which has been treated with a substituted silane. The substantially dehydroxylated clay can be obtained by "shock" calcining a kaolinitic clay.

21 Claims, No Drawings

FILLED ELASTOMER COMPOSITIONS

This application is a continuation-in part of application Ser. No. 191,067 filed Sept. 26, 1980 and entitled "IMPROVEMENTS IN OR RELATING TO FILLERS FOR ELASTOMERS", now abandoned.

BACKGROUND OF THE INVENTION

This invention relates to filled elastomer compositions comprising an elastomer, such as a natural or synthetic rubber, and a filler.

Most mineral fillers which are commonly available and are suitable for incorporation in elastomer compositions provide only a relatively small improvement in the strength of the elastomer composition in which they are incorporated because of their relatively coarse particle size or because of the weak chemical affinity between the elastomer and the surface of the filler particles, or a combination of these two factors. Currently the most widely used reinforcing filler for elastomers is carbon black which is a very finely-divided material and, on account of the hydrophobic nature of its surface, has a good affinity with elastomers. The presence of carbon black in an elastomer composition gives a good increase in the strength of the elastomer.

A particularly stringent duty for elastomer compositions is in the manufacture of motor vehicle tires. Heretofore, carbon black has been used almost exclusively as a filler in these compositions because of its good reinforcing properties. A rubber compound used for motor vehicle tires must have good tensile strength properties, good tear strength and good resistance to abrasion. It must also not be subject to significant permanent deformation after tension or compression, such permanent deformation generally being known in the art as "permanent set." Permanent set may be measured after subjecting a sample of the rubber compound to tension, in which case it is known as "tension set," or after compression, in which case it is known as "compression set." Carbon black is most commonly prepared by burning oil under controlled conditions and is therefore likely to become increasingly expensive and in short supply. Many attempts have been made to find a satisfactory replacement for carbon black. For example, it has been proposed to use inter alia kaolin clays, usually after treatment with an organosilane, see for example British Patent Specifications Nos. 882,058; 948,163; 1,062,595; 1,272,287 and 1,430,125 and U.S. Pat. No. 3,290,165. Whilst these known organosilane-treated kaolin clays have enhanced reinforcing properties as compared with the untreated materials, they do not constitute a satisfactory replacement for carbon black in many applications. It is an object of the present invention to provide an elastomer composition incorporating a filler having reinforcing properties which are comparable to those of semi-reinfrocing carbon blacks.

SUMMARY OF THE INVENTION

According to the present invention there is provided an elastomer composition which comprises an elastomer and a filler wherein the filler is a substantially dehydroxylated clay which contains at least 60% by weight of particles smaller than 2 microns equivalent spherical diameter, has a specific gravity not greater than 2.4 and a specific surface area (as measured by the B.E.T. liquid nitrogen absorption method) of at least 10 $m^2g^{-1}$ and which has been treated with a substituted silane.

The B.E.T. liquid nitrogen absorption method of measuring specific surface area is described in British Standard Specification No. 4359: Part 1: 1969.

Preferably, the substantially dehydroxylated clay has a specific gravity not greater than 2.2. and a specific surface area of at least 20 $m^2g^{-1}$. Advantageously, the dehydroxylated clay has a particle size distribution such that it contains at least 80% by weight of particles smaller than 2 microns equivalent spherical diameter.

The substantially dehydroxylated clay is treated with a substituted silane. Substituted silanes which have been found to be particularly useful in the present invention include substituted silanes of the polysulphide type and those containing at least one aminoalkyl or mercaptoalkyl group and at least one hydroxy, hydroxyalkyl or alkoxy group. Most preferably, the substituted silane is either (a) one which can be represented by the general formula:

(I)

wherein $R_1$ is an aminoalkyl or mercaptoalkyl group, $R_2$ is a hydroxy, hydroxyalkyl or alkoxy group, and each of $R_3$ and $R_4$, which may be the same or different, is a hydrogen atom or a hydroxy, alkyl, hydroxyalkyl or alkoxy group; or (b) one which can be represented by the general formula:

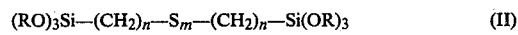

$$(RO)_3Si-(CH_2)_n-S_m-(CH_2)_n-Si(OR)_3 \qquad (II)$$

wherein R is an alkyl group having from 1 to 8 carbon atoms, m is 1,2,3 or 4 and n is 1,2,3 or 4. When the substituted silane can be represented by general formula (I) above, it is preferred that each of $R_2$, $R_3$ and $R_4$ is a hydroxy, hydroxyalkyl or alkoxy group and each of $R_1$, $R_2$, $R_3$ and $R_4$ contains not more than 4 carbon atoms.

Generally, a dehydroxylated clay filler in accordance with the invention will be coated with at least 0.05% by weight, and preferably at least 0.25% by weight, of the substituted silane. Usually, the amount of substituted silane used to coat the dehydroxylated clay filler is in the range of from 0.4% to 0.8% by weight based on the weight of dry dehydroxylated clay filler. The use of less than 0.05% by weight of the substituted silane gives an insignificant increase in the reinforcing properties of the dehydroxylated clay filler as compared with the uncoated dehydroxylated clay filler. On the other hand there is little advantage in using more than about 0.8% by weight of the substituted silane, and if more than about 2.0% by weight of the substituted silane is used, this causes cross-linking of the elastomer giving a brittle product.

One method of preparing the dehydroxylated clay filler for use in the elastomer compositions of the invention comprises "shock" calcining a kaolinitic clay containing at least 60% by weight of particles smaller than 2 microns equivalent spherical diameter (e.s.d), for example by exposing the clay for a time not exceeding about 5 seconds in a combustion chamber to a temperature such that on leaving the combustion chamber the substantially dehydroxylated clay has a temperature (a discharge temperature) in the range of from 500° C. to 1100° C. Preferably, the clay contains at least 80% by weight of particles smaller than 2 microns equivalent spherical diameter. Thus, a filler for use in the invention can be prepared by fractionating or comminuting a pulverised kaolinitic clay so that it has a particle size distribution such that at least 60%, and preferably at least 80%, by weight thereof consists of particles having an equivalent spherical diameter smaller than 2 microns, and thereafter "shock" calcining the kaolinitic clay for a time not exceeding about 5 seconds under conditions such that it has a discharge temperature in the range of from 500° C. to 1100° C. Most preferably, the dry, pulverised kaolinitic clay is "shock" calcined for a time of about 1 second under conditions such that it has a discharge temperature in the range of from 600° C. to 900° C. This procedure is conveniently carried out by injecting the kaolinitic clay into a combustion chamber wherein a vortex is established which rapidly removes the calcined clay from the combustion chamber. An apparatus suitable for this purpose is described in British Patent Specification No. 869,966. If necessary to ensure that the calcined clay contains at least 80% by weight of particles smaller than 2 microns e.s.d., the calcined clay can be comminuted by, for example, dry ball milling or fluid energy milling to break up any aggregates which form during the calcination step. It is believed that the calcination conditions should be such that, after calcination, the substantially dehydroxylated clay has a surface hydroxyl content of from 1 to 7, preferably 2 to 6, groups/nm$^2$ (compared with 10 to 12 hydroxyl groups/nm$^2$ for the uncalcined clay).

Uncalcined kaolinitic clays and kaolinitic clays calcined by the "soak" calcination method (in which the clay is subjected to a temperature greater than 500° C. for a time greatly in excess of 5 seconds and usually more than 1 hour) both typically have a specific gravity in the range of from 2.5 to 2.7. In addition the specific surface area of "soak" calcined kaolin rarely exceeds 12 m$^2$g$^{-1}$.

The fillers according to the invention can constitute the sole filler in the filled elastomer compositions or it can be mixed in any proportions with other fillers, such as carbon black.

The elastomer of the elastomer compositions according to the present invention can be a natural rubber and/or synthetic rubber. Examples of synthetic rubbers which can be employed are styrene-butadiene rubber (SBR), nitrile rubber, a polybutadiene, or a polyisoprene. The elastomer compositions will normally also contain conventional additives such as accelerators, vulcanising activators and processing aids.

The invention is further illustrated by the following Examples.

EXAMPLE 1

A Dorset ball clay having a particle size distribution such that 4% by weight consisted of particles having an equivalent spherical diameter larger than 5 microns, 88% by weight consisted of particles having an equivalent spherical diameter smaller than 2 microns and 77% by weight consisted of particles having an equivalent spherical diameter smaller than 1 micron, was milled in order to break up aggregates and coarse particles. The milled ball clay had a particle size distribution such that there were no particles larger than 53 microns, 1.5% weight consisted of particles having an equivalent spherical diameter larger than 5 microns, 90% by weight consisted of particles having an equivalent spherical diameter smaller than 2 microns, and 80% by weight consisted of particles smaller than 1 micron. The milled clay was "shock" calcined by injecting it into a cyclone-shaped combustion chamber in which it was exposed for an average of about 1 second to a temperature such that on leaving the combustion chamber the calcined clay had a temperature of 700° C. The calcined clay had a particle size distribution such that 80% by weight of the particles had an equivalent spherical diameter smaller than 2 microns, a specific gravity of 2.2 and a specific surface area of 13 m$^2$g$^{-1}$. Samples of the calcined clay were mixed with different amounts of 3-mercaptopropyltrimethoxysilane, and the coated clay samples were incorporated into a motor vehicle tire carcass composition having the following ingredients:

| COMPOSITION | |
|---|---|
| Ingredient | Parts by weight |
| Natural rubber | 50 |
| Styrene butadiene rubber | 50 |
| Stearic acid | 1.5 |
| Zinc oxide | 3.0 |
| Proprietary blend of non-staining antioxidants | 2.0 |
| Pale coumarone resin | 3.0 |
| N—cyclohexyl-2-benzothiazyl sulphenamide (CBS) | 1.5 |
| Tetramethyl thiuram disulphide (TMTD) | 0.1 |
| Magnesium carbonate coated sulphur | 2.0 |
| Fast extruding furnace carbon black (FEF) | 54 |
| Silane treated calcined clay | 26 |

The stearic acid and zinc oxide are vulcanising activators, the coumarone resin is a processing aid, the CBS is an accelerator, and the TMTD is a booster accelerator.

The ingredients were mixed and formed into a sheet on a roller mill at ambient temperature and the compound was vulcanised at 153° C. for a time sufficient to give a 95% cure.

Samples of the vulcanised composition were then tested for modulus at 300% elongation, tensile strength, elongation at break, tear strength, compression set, tension set and abrasion loss. The results obtained are set forth in Table 1 below:

TABLE 1

| % by weight of silane based on weight of dry calcined clay | 0 | 0.1 | 0.5 | 1.0 | control |
|---|---|---|---|---|---|
| Modulus at 300% elongation (MNm$^{-2}$) | 9.2 | 10.0 | 11.9 | 11.3 | 12.0 |
| tensile strength (MNm$^{-2}$) | 17.6 | 19.1 | 19.9 | 17.1 | 19.8 |
| elongation at break (%) | 400 | 430 | 380 | 330 | 390 |
| tear strength (kNm$^{-1}$) | 48.5 | 57.0 | 50.0 | 55.5 | 63.5 |
| compression set (%) | 29.8 | 27.2 | 20.7 | 20.5 | 25.0 |
| tension set (%) | 27.1 | 24.0 | 22.4 | 20.0 | 25.0 |
| abrasion loss (mm$^3$) | 164 | 164 | 169 | 166 | 120 |

The control composition was produced as described above except that the silane-treated calcined clay was replaced with an equal volume of a conventional reinforcing filler, viz semi-reinforcing furnace carbon black (SRF). It will be seen that the composition containing calcined clay treated with 0.5% by weight of the silane has substantially identical tensile strength properties to those of the control composition but superior compression set and tension set.

EXAMPLE 2

There were produced 2 further motor vehicle tire carcass compositions having the same formulation as described in Example 1, except that the silane-treated calcined Dorset ball clay was replaced with a silane-treated calcined clay from S. Carolina, U.S.A. This latter kaolin clay had a particle size distribution such that substantially all of the particles had an equivalent spherical diameter smaller than 5 microns, 90% by weight consisted of particles having an equivalent spherical diameter smaller than 2 microns, and 70% by weight consisted of particles having an equivalent spherical diameter smaller than 1 micron. The kaolin clay was "shock" calcined by injecting it into a cyclone-shaped combustion chamber in which it was exposed for an average time of about 1 second to a temperature such that the product discharged from the combustion chamber had a temperature of 700° C. The calcined clay had a particle size distribution such that 80% by weight consisted of particles having an equivalent spherical diameter smaller than 2 microns, a specific gravity of 2.2, and a specific surface area of 23 $m^2g^{-1}$. The calcined clay was divided into two portions, one of which was mixed with 0.5% by weight, based on the weight of dry calcined clay of 3-mercaptopropyltrimethoxysilane and incorporated into a motor vehicle tire carcass composition of the type described in Example 1, and the other portion was incorporated into such a motor vehicle tire carcass composition without preliminary silane treatment.

Samples of the vulcanised compositions containing the silane-treated and the untreated calcined clay were tested for modulus at 300% elongation, tensile strength, elongation at break, tear strength, compression and tensile set, and the results obtained are set forth in Table II below.

TABLE II

| | silane-treated calcined clay | untreated calcined clay |
|---|---|---|
| modulus at 300% elongation ($MNm^{-2}$) | 14.7 | 11.9 |
| tensile strength ($MNm^{-2}$) | 20.1 | 19.9 |
| elongation at break (%) | 350 | 385 |
| tear strength ($kNm^{-1}$) | 67.0 | 60.0 |
| compression set (%) | 22.0 | 27.2 |
| tension set (%) | 20.5 | 22.4 |

The compositions had roughly equivalent tensile properties, but the composition containing the silane-treated calcined clay had superior tear strength, compression set and tension set.

EXAMPLE 3

Further motor vehicle tire carcass compositions were prepared according to the same formulation as set out in Example 1, except that no carbon black was used, the sole reinforcing filler being 104 grams of the calcined kaolin clay described in Example 2. One composition was prepared containing the calcined kaolin clay treated with 0.5% by weight, based on the weight of dry calcined kaolin, of 3-mercaptopropyltrimethoxysilane, and a second composition containing untreated calcined kaolin clay. Samples of the vulcanised compositions were tested for modulus at 300% elongation, tensile strength, elongation at break, tear strength, compression set and tension set, and the results obtained are set forth in Table III below.

TABLE III

| | silane-treated calcined clay | untreated calcined clay |
|---|---|---|
| modulus at 300% elongation | 11.0 | 10.0 |
| ($MNm^{-2}$) | | |
| tensile strength ($MNm^{-2}$) | 19.1 | 19.0 |
| elongation at break (%) | 525 | 572 |
| tear strength ($Knm^{-1}$) | 59.0 | 55.0 |
| compression set (%) | 28.5 | 30.0 |
| tension set (%) | 29.0 | 30.0 |

Again the compositions containing the silane treated calcined clay had superior tear strength, compression set and tension set properties.

EXAMPLE 4

Three further motor vehicle tire carcass compositions were prepared according to the formulation described in Example 1, except that the silane-treated calcined Dorset ball clay filler was replaced by, respectively:

(1) An uncalcined china clay from Cornwall having a specific gravity of 2.64, a specific surface area of 10.5 $m^2g^{-1}$, and a particle size distribution such that 0.1% by weight consisted of particles having an equivalent spherical diameter larger than 10 microns and 80% by weight consisted of particles having an equivalent spherical diameter smaller than 2 microns.

(2) A "soak" calcined kaolin which was formed by subjecting Clay (1) to a temperature of 1050° C. for 1 hour. This calcined clay had a specific gravity of 2.6, and a specific surface area of 8.5 $m^2g^{-1}$ and a particle size distribution such that 50% by weight thereof consisted of particles with an equivalent spherical diameter smaller than 2 microns.

(3) A "shock" calcined kaolin which was formed by injecting the S. Carolina kaolin clay which was used in Example 2 into a cyclone-shaped combustion chamber in which it was exposed for an average time of about 1 second to a temperature such that it had a discharge temperature of 700° C.

In each case the clay or calcined clay filler was mixed with 0.5% by weight, based on the weight of dry clay, of 3-mercaptopropyltrimethoxysilane and incorporated into a motor vehicle tire carcass composition of the type described in Example 1. Samples of the valcanised compositions containing the silane-treated clays were tested for modulus at 300% elongation, tensile strength, tear strength, compression set, tension set and abrasion loss, and the results obtained are set forth in Table IV below:

TABLE IV

| Filler | (1) | (2) | (3) |
|---|---|---|---|
| Modulus at 300% elongation ($MNm^{-2}$) | 8.9 | 12.4 | 11.9 |
| tensile strength ($MNm^{-2}$) | 18.9 | 18.9 | 19.5 |
| tear strength ($kNm^{-1}$) | 58.5 | 60.0 | 68.5 |
| compression set (%) | 28.2 | 24.0 | 22.6 |
| tension set (%) | 27.0 | 20.0 | 12.0 |
| abrasion loss ($mm^3$) | 168 | 171 | 151 |

It will be seen that only a small improvement in reinforcing properties, compared with those exhibited by the silane-treated uncalcined clay, is obtained with the silane-treated "soak" calcined clay which has been calcined at 1050° C. for 1 hour. However a much greater improvement is achieved with the silane-treated "shock" calcined clay, especially in tear strength, compression and tension set and abrasion loss.

EXAMPLE 5

Four nitrile rubber hose compositions A, B, C and D were prepared according to the following formulations:

| Compositions | Parts by weight | | | |
|---|---|---|---|---|
| | A | B | C | D |
| nitrile rubber | 100 | 100 | 100 | 100 |
| stearic acid | 1 | 1 | 1 | 1 |
| zinc oxide | 5 | 5 | 5 | 5 |
| antioxidant | 2 | 2 | 2 | 2 |
| dioctylphthalate plasticiser | 15 | 15 | 15 | 15 |
| sulphur | 2 | 2 | 2 | 2 |
| dibenzthiazyl disulphide | 1.5 | 1.5 | 1.5 | 1.5 |
| tetramethyl thiuram monosulphide filler | 0.4 | 0.4 | 0.4 | 0.4 |
| | 130 | 130 | 130 | 0 |
| semi-reinforcing furnace carbon black | 0 | 0 | 0 | 90 |

In Composition A the filler was formed by injecting the S, Carolina kaolin clay which was used in Example 2 into a cyclone-shaped combustion chamber in which it was exposed for an average time of about 1 second to a temperature such that it had a discharge temperature of 700° C. The "shock" calcined clay has a specific gravity of 2.2, a specific surface area of 23 $m^2g^{-1}$ and a particle size distribution such that 80% by weight consisted of particles having an equivalent spherical diameter smaller than 2 microns. No substituted silane was mixed with this filler.

In Composition B the filler was the same calcined kaolin clay as was used in Composition A but it was mixed with 0.65% by weight, based on the weight of dry calcined clay, of 3-mercaptoproplytrimethoxysilane.

In Composition C the filler was formed by subjecting the kaolin clay described in Example 4 (1) to a temperature of 1050° C. for 1 hour. This "soak" calcined clay had a specific gravity of 2.6, a specific surface area of 8.5 $m^2g^{-1}$ and a particle size distribution such that 50% by weight consisted of particles having an equivalent spherical diameter smaller than 2 microns. The "soak" calcined clay was mixed with 0.65% by weight, based on the weight of dry calcined clay, of 3-mercaptopropyltrimethoxysilane.

Samples of the vulcanised compositions A, B, C and D were tested for modulus at 300% elongation, tensile strength, elongation at break and tear strength and the results obtained are set forth in Table V below.

TABLE V

| Composition | A | B | C | D |
|---|---|---|---|---|
| Modulus at 200% elongation ($MNm^{-2}$) | 5.1 | 10.0 | 5.2 | 14.5 |
| tensile strength ($MNm^{-2}$) | 10.4 | 12.5 | 6.7 | 15.1 |
| elongation at break (%) | 650 | 510 | 490 | 230 |
| tear strength ($kNm^{-1}$) | 100 | 135 | 63 | 110 |

The results for Composition A show that when the filler is prepared by "shock" calcining a kaolin clay in accordance with the invention a composition is obtained which has a tear strength which is comparable with that of the conventional Composition D containing semi-reinforcing carbon black while at the same time having great flexibility as is shown by the high elongation at break.

Comparison of the results for Compositions B and C shows the greatly superior results which are obtained when the kaolin clay is "shock" calcined in accordance with the invention before being mixed with a substituted silane.

EXAMPLE 6

Three motor vehicle tire carcass compositions were prepared according to the following compositions:

| Composition | Parts by weight | | |
|---|---|---|---|
| | A | B | C |
| Natural rubber | 100 | 100 | 100 |
| Zinc oxide | 5 | 5 | 5 |
| Stearic acid | 2 | 2 | 2 |
| Antioxidant | 1 | 1 | 1 |
| Magnesium carbonate coated sulphur | 2 | 2 | 2 |
| General purpose furnace carbon black (GPF) | 72 | 36 | 36 |
| "Shock" calcined clay | 0 | 36 | 0 |
| Silane-treated "shock" calcined clay | 0 | 0 | 36 |

The stearic acid and zinc oxide are vulcanising aids and the general purpose furnace carbon black had an average particle diameter of about 50 nm. The "shock" calcined clay used in Composition B was the calcined kaolin clay described in Example 2. The silane treated calcined clay used in Composition C was prepared by treating the calcined clay described in Example 2 with 0.5% by weight, based on the weight of dry calcined kaolin, of bis-(3-triethoxysilylpropyl)tetrasulphide, which has the formula:

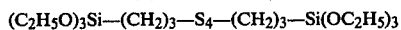

$(C_2H_5O)_3Si—(CH_2)_3—S_4—(CH_2)_3—Si(OC_2H_5)_3$

The ingredients were mixed and formed into a sheet on a roller mill at ambient temperature and the compound was vulcanised at 141° C. for a time sufficient to give a 95% cure.

Samples of the vulcanised composition were then tested for tensile strength, elongation at break, compression set at 70° C. and tension set at 70° C.

The results obtained are set forth in Table VI below:

TABLE VI

| Composition | A | B | C |
|---|---|---|---|
| Tensile strength ($MNm^{-2}$) | 22.9 | 22.1 | 21.2 |
| Elongation at break (%) | 333 | 458 | 423 |
| Compression set (%) | 50.8 | 69.2 | 58.7 |
| Tension set (%) | 18.3 | 32.3 | 20.2 |

These results show that when 50% by weight of the general purpose furnace carbon black in a tire carcass composition is replaced by an equal weight of a kaolin clay "shock" calcined in accordance with the invention but not treated with a substituted silane the properties of the rubber formed are inferior to the properties of a rubber formed from a composition containing GPF carbon black as the sole filler. However when the "shock" calcined kaolin clay is treated with a substituted silane in accordance with the invention, the purpose of the rubber containing GPF carbon black as the sole filler are substantially recovered while the overall cost of the filler is greatly reduced.

What is claimed is:

1. A filled elastomer composition which comprises an elastomer and a filler wherein the filler comprises a substantially dehydroxylated clay which contains at least 60% by weight of particles smaller than 2 microns equivalent spherical diameter, has a specific gravity not greater than 2.4 and a specific surface area (as measured by the B.E.T. liquid nitrogen adsorption method) of at least 10 m²g⁻¹ and which has been treated with a substituted silane.

2. A filled elastomer composition as claimed in claim 1, wherein the substantially dehydroxylated clay is a "shock" calcined kaolinitic clay.

3. A filled elastomer composition as claimed in claim 1, wherein said substantially dehydroxylated clay has a specific gravity not greater than 2.2.

4. A filled elastomer composition as claimed in claim 1, wherein said substantially dehydroxylated clay has a specific surface area of at least 20 m²g⁻¹.

5. A filled elastomer composition as claimed in claim 1, wherein the substantially dehydroxylated clay contains at least 80% by weight of particles smaller than 2 microns equivalent spherical diameter.

6. A filled elastomer composition as claimed in claim 1, wherein said substituted silane contains at least one aminoalkyl or mercaptoalkyl group and at least one hydroxy, hydroxyalkyl or alkoxy group.

7. A filled elastomer composition as claimed in claim 6 wherein said substituted silane can be represented by the general formula:

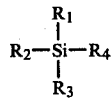

wherein R₁ is selected from aminoalkyl and mercaptoalkyl groups, R₂ is selected from hydroxy, hydroxyalkyl and alkoxy groups, and each of R₃ and R₄, which may be the same or different, is selected from a hydrogen atom and hydroxy, alkyl, hydroxyalkyl and alkoxy groups.

8. A filled elastomer composition as claimed in claim 7 wherein each of R₂, R₃ and R₄ is selected from hydroxy, hydroxyalkyl and alkoxy groups.

9. A filled elastomer composition as claimed in claim 7, wherein each of R₁, R₂, R₃ and R₄ contains not more than 4 carbon atoms.

10. A filled elastomer composition as claimed in claim 1, wherein said substituted silane can be represented by the general formula:

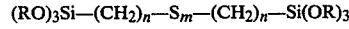

wherein R is an alkyl group having from 1 to 8 carbon atoms, m is 1, 2, 3 or 4, and n is 1,2,3 or 4.

11. A filled elastomer composition as claimed in claim 1, wherein the substantially dehydroxylated clay is coated with at least 0.05% by weight of the substituted silane.

12. A filled elastomer composition as claimed in claim 1, wherein the substantially dehydroxylated clay is coated with from 0.4% to 0.8% by weight, based on the weight of substantially dehydroxylated clay, of the substituted silane.

13. A filled elastomer composition as claimed in claim 1, wherein the elastomer is a natural rubber and/or a synthetic rubber.

14. A filled elastomer composition which comprises an elastomer and a filler wherein the filler comprises a "shock" calcined clay which has a specific gravity not greater than 2.2. and a specific surface area (as measured by the B.E.T. liquid nitrogen adsorption method) of at least 20 m²g⁻¹ and which has been treated with from 0.25% to 2.0% by weight, based on the weight of "shock" calcined kaolinitic clay, of a substituted silane which can be represented by the general formula:

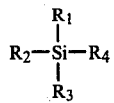

wherein R₁ is selected from aminoalkyl and mercaptoalkyl groups, R₂ is selected from hydroxy, hydroxyalkyl and alkoxy groups, and each of R₃ and R₄, which may be the same or different, is selected from a hydrogen atom and hydroxy, hydroxyalkyl and alkoxy groups.

15. A filled elastomer composition as claimed in claim 14 wherein the "shock" calcined kaolinitic clay contains at least 80% by weight of particles smaller than 2 microns equivalent spherical diameter.

16. A filled elastomer composition as claimed in claim 14, wherein the "shock" calcined kaolinitic clay filler has been treated with not more than 0.8% by weight based on the weight of the calcined kaolinitic clay filler, of said substituted silane.

17. A filled elastomer composition which comprises an elastomer and a filler wherein the filler comprises a calcined kaolinitic clay which has a specific gravity not greater than 2.2 and a specific surface area (as measured by the B.E.T. liquid nitrogen adsorption method) of at least 20 m²g⁻¹ and which has been treated with from 0.25% to 2.0% by weight, based on the weight of calcined kaolinitic clay, of a substituted silane which can be represented by the general formula:

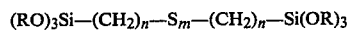

wherein R is an alkyl group having from 1 to 8 carbon atoms, m is 1,2,3 or 4, and n is 1,2,3 or 4.

18. A filled elastomer composition as claimed in claim 17, wherein the calcined kaolinitic clay contains at least 80% by weight of particles smaller than 2 microns equivalent spherical diameter.

19. A filled elastomer composition as claimed in claim 17, wherein the calcined kaolinitic clay filler has been treated with not more than 0.8% by weight, based on the weight of the calcined kaolinitic clay filler, of said substituted silane.

20. A motor vehicle tire carcass composition including an elastomer and a filler wherein the filler is obtained by "shock" calcining a kaolinitic clay containing at least 80% by weight of particles smaller than 2 microns equivalent spherical diameter so as to obtain a "shock" calcined kaolinitic clay having a specific gravity not greater than 2.2 and a specific surface area (as measured by the B.E.T. liquid nitrogen adsorption method) of at least 20 m²g⁻¹ and wherein the filler is treated with from 0.25% to 0.8% by weight, based on the weight of the "shock" calcined kaolinitic clay, of a substituted silane which can be represented by the general formula:

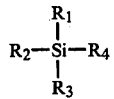

wherein $R_1$ is selected from aminoalkyl and mercaptoalkyl groups, $R_2$ is selected from hydroxy, hydroxyalkyl and alkoxy groups, and each of $R_3$ and $R_4$, which may be the same or different, is selected from a hydrogen atom and hydroxy, hydroxyalkyl and alkoxy group and wherein each of $R_1$, $R_2$, $R_3$ and $R_4$ contains not more than 4 carbon atoms.

21. A motor vehicle tire carcass composition including an elastomer and a filler wherein the filler is obtained by "shock" calcining a kaolinitic clay containing at least 80% by weight of particles smaller than 2 microns equivalent spherical diameter so as to obtain a "shock" calcined kaolinitic clay having a specific gravity not greater than 2.2 and a specific surface area (as measured by the B.E.T. liquid nitrogen adsorption method) of at least 20 $m^2g^{-1}$ and wherein the filler is treated with from 0.25% to 0.8% by weight, based on the weight of the "shock" calcined kaolinitic clay, of a substituted silane which can be represented by the general formula:

$$(RO)_3Si-(CH_2)_n-S_m-(CH_2)_n-Si(OR)_3$$

wherein R is an alkyl group having from 1 to 8 carbon atoms, m is 1,2,3 or 4, and n is 1,2,3 or 4.

* * * * *

UNITED STATES PATENT AND TRADEMARK OFFICE
CERTIFICATE OF CORRECTION

PATENT NO. : 4,427,452
DATED : January 24, 1984
INVENTOR(S) : David G. Jeffs

It is certified that error appears in the above-identified patent and that said Letters Patent are hereby corrected as shown below:

On the cover page, claim to priority of a foreign application should be inserted as follows:

[30] Foreign Application Priority Data

September 26, 1980 [GB] United Kingdom............191067

Signed and Sealed this

Sixth Day of August 1985

[SEAL]

*Attest:*

DONALD J. QUIGG

*Attesting Officer*   *Acting Commissioner of Patents and Trademarks*

UNITED STATES PATENT AND TRADEMARK OFFICE
CERTIFICATE OF CORRECTION

PATENT NO. : 4,427,452
DATED : January 24, 1984
INVENTOR(S) : David G. Jeffs

It is certified that error appears in the above–identified patent and that said Letters Patent are hereby corrected as shown below:

On the cover page, claim to priority of a foreign application should be inserted as follows:

[30]   Foreign Application Priority Data

October 1, 1979 [GB] United Kingdom.............7933971

This certificate supersedes Certificate of Correction issued August 6, 1985.

Signed and Sealed this

Tenth Day of December 1985

[SEAL]

Attest:

Attesting Officer

DONALD J. QUIGG

Commissioner of Patents and Trademarks